Aug. 15, 1939.    C. O. LEE ET AL    2,169,262
APPARATUS FOR PURIFYING SULPHUR
Filed Oct. 2, 1937    2 Sheets-Sheet 1

INVENTORS
Clarence O. Lee
Homer A. Smith
BY Watson, Bristol, Johnson & Leavenworth
ATTORNEYS Aug. 15, 1939.                C. O. LEE ET AL                2,169,262
                        APPARATUS FOR PURIFYING SULPHUR
                        Filed Oct. 2, 1937          2 Sheets-Sheet 2

INVENTORS
Clarence O. Lee
Homer A. Smith
BY Watson, Bristol, Johnson & Leavenworth
ATTORNEYS Patented Aug. 15, 1939

2,169,262

UNITED STATES PATENT OFFICE 2,169,262

APPARATUS FOR PURIFYING SULPHUR

Clarence O. Lee and Homer A. Smith, Port Sulphur, La., assignors to Freeport Sulphur Company, Freeport, Tex., a corporation of Delaware Application October 2, 1937, Serial No. 166,942

10 Claims. (Cl. 23—264)

This invention relates to apparatus for the purification of sulphur, and in particular to apparatus for purifying sulphur in accordance with the process of our copending application, Serial No. 70,572, filed March 24, 1936, when the sulphur is contaminated with a hydrocarbon impurity; this application being a continuation in part of our said application.

The object of the invention is generally to provide suitable apparatus for removing hydrocarbon impurities, particularly the difficultly removable small quantities of such impurities, in an efficient manner and on a commercial scale.

Specifically, an object is to provide apparatus including a boiler-type unit adapted for the distillation of sulphur containing one or more hydrocarbon impurities in a manner which effects the desired heating of the sulphur and avoids the difficulties arising by reason of the foaming of and the reactions in the liquid sulphur while being heated.

Another object is to provide suitable apparatus for distilling sulphur containing one or more hydrocarbon impurities, in a manner which avoids the formation of highly viscous sulphur, for example, such as is generally encountered when sulphur is slowly raised to the temperature of vaporization.

Another object is to provide suitable apparatus for distilling sulphur containing one or more hydrocarbon impurities in a manner yielding hydrogen sulphide and a carbon residue as a result of the reaction of sulphur with a hydrocarbon, while at the same time avoiding intermediate tarry products which generally consist of sulphur, carbon, and hydrogen in various proportions.

Another object is to provide a distilling unit for molten sulphur containing hydrocarbons, as indicated, which is constructed to effect substantially complete removal of the hydrogen sulphide and the carbon residue, that are formed by the reaction in the vapor phase of sulphur with hydrocarbons and normally go over with the distilled sulphur product, by utilizing the principle of countercurrent flow between the crude sulphur being introduced for treatment and a portion of the vaporized sulphur.

Still another object is to provide a distilling unit for molten sulphur containing hydrocarbons, as indicated, with means for delivering the system, when desired, of a portion of the liquid sulphur that contains carbon particles so as to maintain the percentage of carbon residue, present in the liquid sulphur, below a predetermined value, for example, below that at which high viscosities would prevent the efficient transfer of heat and the operation of a thermal siphon in the distilling unit.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which.

Figure 1:
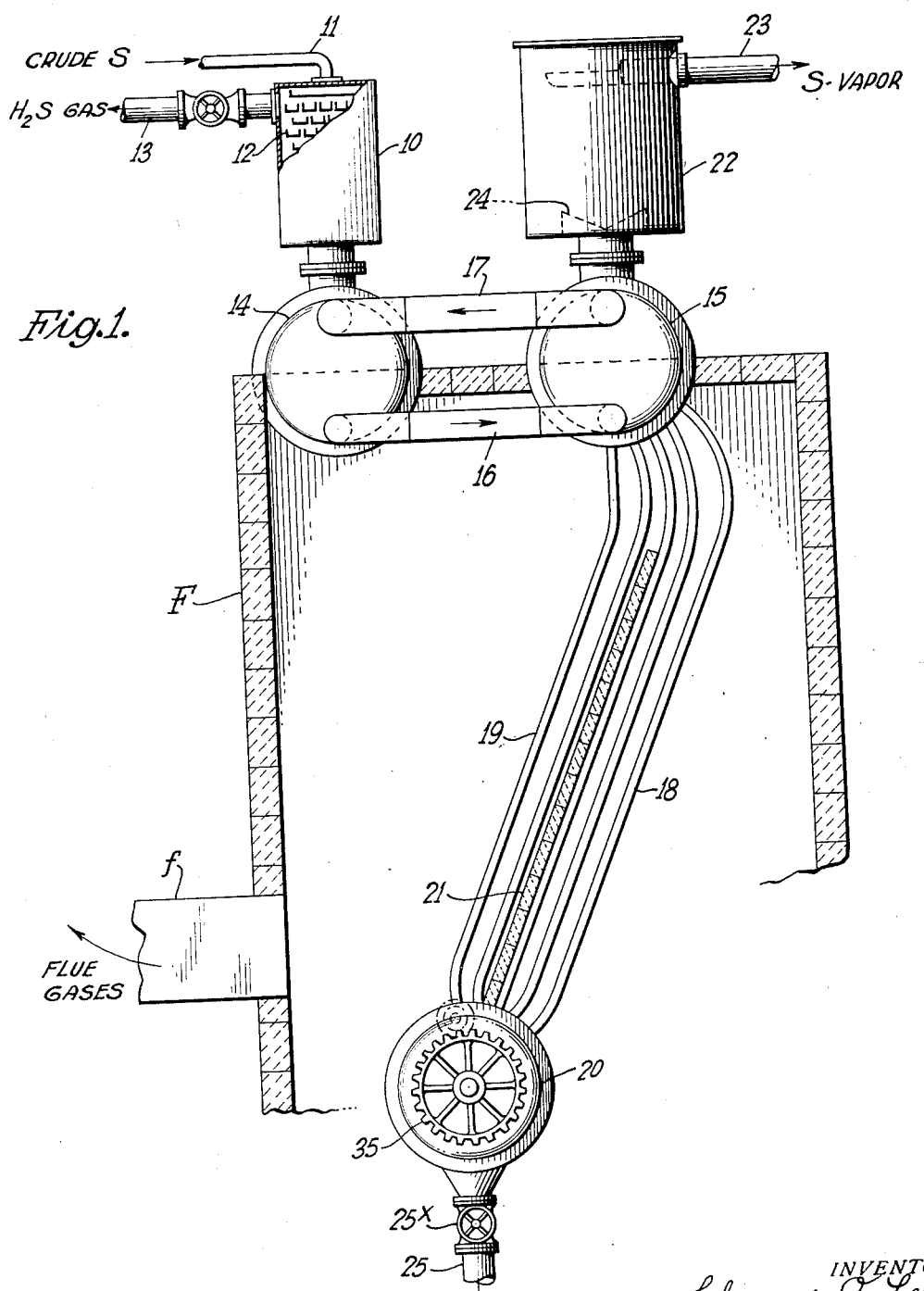
Fig. 1 is a fragmentary view, partly in section and partly in elevation, showing apparatus with a boiler-type distilling unit constructed in accordance with the invention.

According to the process set forth in the aforesaid application, the hydrocarbon impurities initially present in the molten sulphur, produced by mining by underground fusion, are reduced as far as practical by the initial contact of the crude molten sulphur with sulphur vapor. The resulting reaction, however, may leave a residue and generally does not sufficiently remove the hydrocarbon impurities. Hence, in the subsequent heating in the distillation unit, the unreacted hydrocarbons are volatilized along with the sulphur vapor, leaving a carbonaceous residue, so that, unless removed, the resulting sulphur product, upon condensation, is somewhat discolored by reason of the presence of carbonized material.

If the temperature of sulphur containing an impurity of the character indicated is slowly raised from a value near the melting point to the temperature of vaporization, two important events occur, viz.: (1) a reaction between the hydrocarbon and sulphur which evolves hydrogen sulphide gas and precipitates the carbon as a tarry material consisting of carbon, sulphur, and hydrogen in varying proportions; and (2) an increase in the viscosity of sulphur to an order that may be from five to twenty fold, such as the viscosity in the neighborhood of 370° F., over that exhibited near the melting point, or that near the atmospheric boiling point. The rise in viscosity attained by a particular sample of sulphur varies in part with the amount of hydrocarbon impurity present, the maximum viscosity attained being smaller with increasing concentration of the hydrocarbon. In any event, the combined action of hydrogen sulphide evolution and of an increase in viscosity, results in excessive foaming. If the distillation unit were a conventional steam boiler, and the crude sulphur containing such impurity fed directly thereinto, the foaming that would take place would be sufficient to fill the available vapor space and pass on through the vapor exit contaminating the product with tarry material, hydrogen sulphide, and unreacted hydrocarbons.

This reaction between the sulphur and hydrocarbon proceeds for some time, and as the temperature is raised the first formed tarry carbon residue further reacts with sulphur to form the final end products of hydrogen sulphide and a carbon sulphur complex, non-tarry in nature and containing about 60% sulphur and 40% carbon. This non-tarry carbon-sulphur complex will be referred to hereafter as "sludge" or as "the final carbon residue". In a conventional boiler, the intermediate tarry carbon product would coke or cake on the boiler tubes resulting in lowered heat transfer rates, lessened thermal circulation and greatly increased corrosion of the tubes, due to the higher temperatures experienced on the tube surfaces. Finally, when vaporization of the sulphur takes place, there is also vaporized any unreacted hydrocarbons which will thereafter react with the sulphur vapor forming as usual hydrogen sulphide and the final carbon residue. These impurities are admixed with and suspended in the vaporized sulphur, and would seriously contaminate the product in a boiler of conventional design.

These difficulties, heretofore associated with the purification by distillation of sulphur containing hydrocarbon impurities, are avoided by providing distillation apparatus including a novel arrangement of organs in accordance with the invention. The apparatus herein disclosed overcomes such difficulties as are caused by high viscosities, foaming, the presence of tarry reaction products, and contamination resulting from further reactions in the vapor phase.

Figure 2:
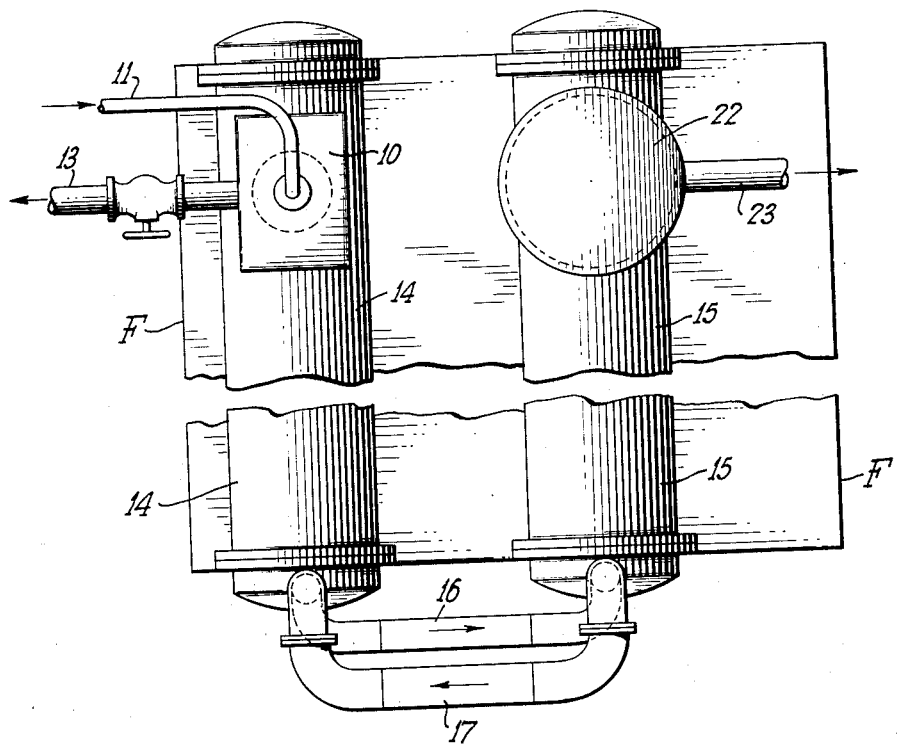
Fig. 2 is a top plan view, parts being broken away, showing the arrangement of the top drums employed in the distilling unit illustrated in Fig. 1.

Referring now to the drawings, and particularly to Figs. 1 and 2, a separate preheater 10 is provided for effecting the first step of quick heating in the treatment of crude molten sulphur in accordance with the process of the aforesaid application. This preheater may have any suitable form known to the heat exchanging art. A preferred form, however, comprises a chambered vessel, as shown, where the crude molten sulphur to be introduced for treatment is supplied at the top by means of a conduit 11 and is divided or dispersed and made to pass through an atmosphere of sulphur vapor by means of a series of perforated trays or diaphragms 12 that are disposed in the chamber and through which the crude molten sulphur passes by drops from tray to tray. The sulphur vapor for the chamber is supplied at the bottom, for example, from the distillation unit, as hereinafter described. Non-condensable gas, for example, hydrogen sulphide produced by the reaction of sulphur vapor with the hydrocarbon impurity, is drawn off through a suitable vent, such as conduit 13. The preheater 10 is arranged to communicate with and discharge into an organ or vessel, designated a "retention drum", here shown at 14. It is preferably attached to the drum adjacent one end and the liquid exit from the drum attached at the other end, as hereinafter explained.

The distillation unit of the present invention also includes a second vessel, designated a "separating drum" 15 that is associated with and connected to the drum 14 both above and below the liquid level which normally obtains therein. The liquid connection is provided by means of a conduit 16 that is preferably connected below the liquid level to the adjacent ends of each drum. The vapor connection is provided by means of a similar conduit 17 that may be parallel to conduit 16 and is connected above the liquid level to adjacent ends of each drum. To achieve circulation of the sulphur in the unit while being heated two sets of rising tubes, shown respectively at 18 and 19, are connected with separate portions of the bottom of drum 15 and lead from a third or bottom drum 20. To heat the distillation unit, a suitable furnace is provided, whose walls F preferably enclose and support the unit. This furnace may be fired in any convenient manner, for example, oil fired, and has a flue f for the exit of flue gases and the products of combustion. To insure the proper passage of the flue gases over the tubes as they go to their exit, one or more refractory baffles are preferably constructed in the furnace. Such a baffle is shown at 21 and extends from the top wall of drum 20 upwardly between the sets of tubes 18 and 19, to a point a little below the under wall of drum 15.

To collect the vapor distilled by the unit, the drum 15 is provided with suitable collecting means, such as a vapor dome 22 that is preferably attached to the drum 15 at the end remote from that where conduits 16 and 17 are attached. The vapor dome has a suitable vapor exit in the form of a conduit 23, and suitable separating means 24 for removing condensate and other particles that may be carried into the same by the flow of vapor.

Figure 3:
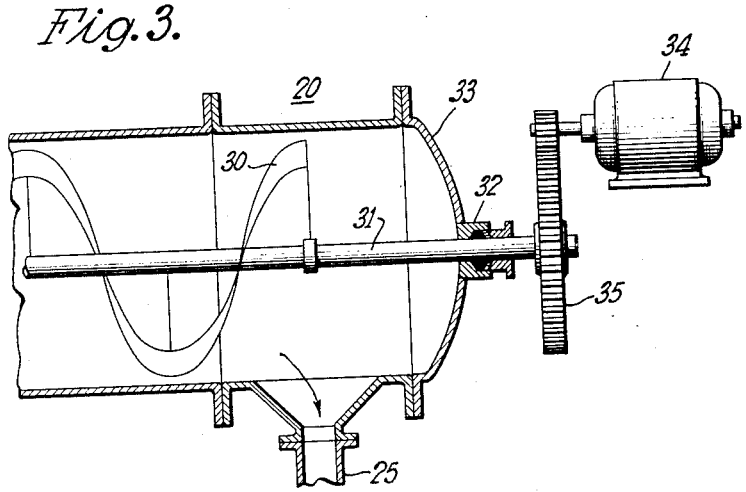
Fig. 3 is a fragmentary sectional view showing details of the bottom drum, illustrated in Fig. 1.

To remove sludge from the distillation unit as desired, a suitable exit conduit, as shown at 25, is attached to the bottom drum 20, by means of which sludge is withdrawn by "blow-down" through the conduit; the "blow-down" being either continuous or intermittent, as desired.

Where the bottom drum 20 has considerable length, it may be desirable to collect the sludge at one end of the drum for quick withdrawal through conduit 25. For this purpose, the drum is preferably provided with a removing means which may have any suitable form, for example, a screw conveyor 30, as shown in Fig. 3, which has a shaft 31 passing through a stuffing box 32 formed on the end of a collecting dome 33 secured preferably to the end of the drum in which the carbon concentration is highest, i. e., the end opposite the incoming crude sulphur. The outer end of the shaft 31 is arranged to be driven by suitable driving means, for example, an electric motor 34 which may be connected to drive the shaft 31 through gearing, as shown at 35. In this arrangement, the sludge conveying conduit 25 is controlled by suitable means, such as valve 25x, and leads from the lower portion of collecting dome 33 to a desired point of disposal. By withdrawing sludge at a proper rate, the distilling unit may be operated continuously.

By the arrangement above described, the crude molten sulphur containing one or more hydrocarbon impurities is made to pass downwardly in a finely divided state, when introduced into the preheater 10, and comes in intimate contact with sulphur vapors rising from the drum 14 and entering the preheater through the bottom. This vapor imparts its heat to the finely divided sulphur, thus losing its latent heat of vaporization and becoming condensed to liquid sulphur. The crude sulphur gains heat so rapidly that, in a period of time of the order of seconds, its temperature is raised to a value near the boiling point. This step of heating molten sulphur by contact with sulphur vapor causes the temperature of the sulphur supplied for purification to pass so rapidly through the stage at which maximum viscosity normally occurs, that only a slight rise in viscosity is experienced. It can be shown experimentally that with rapid heating, sulphur does not exhibit a great viscosity rise, probably because the high viscosity is due to a molecular rearrangement which takes an appreciable time to develop.

During this rapid heating step the reaction between hydrocarbons and sulphur begins. In the preheater 10 very little if any reaction occurs at the lower temperatures, so rapidly is the temperature elevated. The tarry intermediate carbon residues are avoided and the reaction goes at once to hydrogen sulphide and the final carbon residue. The foaming due to hydrogen sulphide evolution is slight because of the relatively low viscosities exhibited near the boiling temperature of sulphur. The hydrogen sulphide gas readily leaves the liquid sulphur and escapes through the conduit 13.

As above explained, the preferable position of the preheater 10 on the drum 14 is at the end opposite that at which the liquid sulphur connection 16 is made. The purpose of drum 14 is to allow a period of time for retaining the sulphur during which the liquid phase reaction between hydrocarbons and sulphur can be completed. As the liquid sulphur passes slowly from the preheater 10 to the exit end of drum 14, it is kept at a temperature near the boiling point. Heat losses are replaced partly by heat from flue gases from the furnace F. To this end, the flue gases are preferably made to pass under the drum 14. Another part is replaced by the sulphur vapors from the drum 15, which are constantly passing through the vapor return connection 17. Any hydrogen sulphide which results from reactions in the liquid sulphur in drum 14 is swept back to the preheater 10 and thence to the exhaust vent 13 by virtue of the countercurrent flow of sulphur vapors from the drum 15. The liquid sulphur passes through the connection 16 into drum 15. On entering said drum the incoming liquid sulphur by reason of the thermal circulation proceeds down the back set of tubes 19 to the bottom drum 20 and thence up the front set of tubes 18, absorbing heat during the upward passage from the tubes which in turn absorb heat from the combustion of fuel in furnace F. The number and arrangement of tubes can, of course, be varied. It is preferred, however, to use five staggered rows of tubes with a brick baffle wall extending almost to the lower surface of drum 15 between the third and fourth rows of tubes. This baffle wall aids in the thermal circulation of the liquid sulphur by maintaining a greater temperature difference between the front and back sets of tubes.

The heat absorbed in the passage of the liquid sulphur through the tubes 18 into drum 15 is sufficient to cause considerable vaporization of any unreacted hydrocarbons. The final reaction between sulphur and hydrocarbons now occurs in the vapor phase with the formation of the end products of hydrogen sulphide and the final carbon residue. This is prevented from leaving the unit as a distillation product by virtue of the countercurrent flow of sulphur vapors to the preheater 10, as above described. In the apparatus disclosed, approximately 50% of the sulphur, vaporized in the boiler tubes, returns through vapor conduit 17 to the preheater 10 for heating the incoming crude molten sulphur. The arrangement of the vapor conduit 17 and the vapor dome 22 at opposite ends of the drum 15 effectively prevents any of the sulphur vapor containing the vapor phase reaction products from entering the vapor dome 22 and contaminating the product sulphur vapor. The return flow of sulphur vapor sweeps all the vapor phase reaction products into the preheater 10 where the hydrogen sulphide is vented from the system and the carbon residue is trapped in the liquid sulphur.

In drum 15 the liquid sulphur containing only carbon in suspension and free from hydrocarbons reaches the end adjacent the vapor dome 22 where it again passes down tubes 19 and up through tubes 18, absorbing heat and generating vapor. This sulphur vapor is free from hydrogen sulphide, hydrocarbon impurities and minute particles of carbon residue such as are formed in the vapor phase reaction. The vapor may, however, contain droplets of liquid sulphur containing carbon residue mechanically entrained by the sulphur vapor. These are removed, however, by the baffle 24, which retards somewhat the velocity of the outgoing sulphur vapor so that the droplets of impure sulphur vapor may be separated from the sulphur vapors and be carried back into drum 15. Some liquid sulphur results from a partial condensation of the sulphur vapor caused by the heat losses at the outer wall of the vapor dome. This type of carbon contamination removed by the vapor dome is to be recognized as radically differing from carbon produced by vapor phase reaction. The carbon residue formed by vapor phase reaction is of such minute size that separation from the sulphur vapor by retardation of its velocity would be impossible to accomplish in a practical manner. Through the principle of countercurrent flow, as herein disclosed, this vapor phase type of carbon contamination can be avoided in the final product. Without the utilization of countercurrent flow, the sulphur product takes on an undesirable greenish hue due to the presence of minute carbon residue particles from the vapor phase reaction.

The sulphur vapor, upon leaving the dome 22 freed from all impurities, passes through connection 23 to a suitable condenser (not shown), such as a water tube condenser, or a countercurrent flow heat exchanger. In the condenser the purified sulphur vapor is condensed; the latent heat of vaporization and sensible heat of the liquid sulphur down to a value near the melting point temperature in such condenser being preferably conserved by suitable means and used, for example, in partially preheating the incoming crude sulphur.

The process, described in the aforesaid application, is made continuous for the present apparatus by the provision of a conduit 25 together with its valve 25x for effecting the removal from the bottom drum 20 of a portion of the liquid sulphur that contains the carbon particles in suspension at a proper rate. This familiar principle of "blow-down", either intermittent or continuous, keeps the carbon concentration in the boiler below the point at which higher viscosities will result in lowered thermal circulation, lessened heat transfer and coking of carbon residue on the front set of tubes. The desirable carbon content lies somewhat below 4%. For example, we prefer to maintain it from about 1.5 to 2.5%.

The materials from which the various parts of the present apparatus are constructed are preferably those most resistant to corrosion from sulphur. Certain alloys have been ascertained as suitable for this purpose; for example, a ferrous alloy of 18% chromium and 8% nickel, commonly known as stainless steel, is highly resistant. As a second example may be mentioned an alloy of iron with 27% chromium.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. Apparatus for purifying sulphur comprising the combination with means for supplying crude molten sulphur, of a distillation unit connected for receiving the molten sulphur supplied and comprising a sulphur retaining drum, an associated drum having vapor and liquid pipe connections leading to said retaining drum at points respectively above and below the normal liquid level therein, a bottom drum, and a plurality of sets of risers connecting said bottom drum to said associated drum at a plurality of different levels thereby establishing a thermal siphon to circulate molten sulphur, means for passing products of combustion about said risers and drums to heat the same, a chamber interposed in said sulphur supply and having free communication with said retaining drum adjacent the end removed from said vapor and liquid connections, liquid sulphur dispersing means interposed in said chamber for dividing the crude molten sulphur and effecting the rapid heating of the same by permitting contact with the sulphur vapor supplied, a vapor collecting dome connected to said associated drum at the end remote from said vapor and liquid connections, and means for withdrawing sulphur vapor collected as sulphur distillate in said collecting dome.

2. Apparatus for purifying sulphur comprising the combination with means for supplying crude molten sulphur, of a distillation unit connected for receiving the molten sulphur supplied and comprising a sulphur retaining drum, an associated drum having vapor and liquid pipe connections leading to said retaining drum at points respectively above and below the normal liquid level therein, a bottom drum, and a plurality of sets of risers connecting said bottom drum to said associated drum at a plurality of different levels thereby establishing a thermal siphon to circulate molten sulphur, means for passing products of combustion about said risers and drums to heat the same, a chamber interposed in said sulphur supply and having free communication with said retaining drum adjacent the end removed from said vapor and liquid connections, liquid sulphur dispersing means interposed in said chamber for dividing the crude molten sulphur and effecting the rapid heating of the same by permitting contact with the sulphur vapor supplied, a vapor collecting dome communicating with said associated drum at the end remote from said vapor and liquid connections, separating means in said dome for separating the sulphur vapor from a contaminating agent, and means for withdrawing the sulphur vapor to yield a sulphur product.

3. Apparatus for purifying sulphur comprising the combination with means for supplying crude molten sulphur, of a distillation unit connected for receiving the molten sulphur supplied and comprising a sulphur retaining drum, an associated drum having vapor and liquid pipe connections leading to said retaining drum at points respectively above and below the normal liquid level therein, a bottom drum, and a plurality of sets of risers connecting said bottom drum to said associated drum at a plurality of different levels thereby establishing a thermal siphon to circulate molten sulphur, means for passing products of combustion about said risers and drums to heat the same, a chamber interposed in said sulphur supply and having free communication with said retaining drum adjacent the end removed from said vapor and liquid connections, liquid sulphur dispersing means interposed in said chamber for dividing the crude molten sulphur and effecting the rapid heating of the same by permitting contact with the sulphur vapor supplied, a vapor collecting dome communicating with said associated drum including means for separating the sulphur vapor from a contaminating agent, means for withdrawing the sulphur vapor, and means associated with said bottom drum for removing sludge as desired.

4. Apparatus for purifying sulphur comprising the combination with means for supplying crude molten sulphur, of a distillation unit connected for receiving the molten sulphur supplied and comprising a sulphur retaining drum, an associated drum having vapor and liquid pipe connections leading to said retaining drum at points respectively above and below the normal liquid level therein, a bottom drum, and a plurality of sets of risers connecting said bottom drum to said associated drum at a plurality of different levels thereby establishing a thermal siphon to circulate molten sulphur, means for passing products of combustion about said risers and drums to heat the same, a chamber interposed in said sulphur supply and having free communication with said retaining drum adjacent the end removed from said vapor and liquid connections, liquid sulphur dispersing means interposed in said chamber for dividing the crude molten sulphur and effecting the rapid heating of the same by permitting contact with the sulphur vapor supplied, a vapor collecting dome communicating with said associated drum including means for separating the sulphur vapor from a contaminating agent, means for withdrawing the sulphur vapor, said lower drum having a vent provided with closing means whereby the vent may be opened and the drum blown down to remove sludge, and screw-conveyor means in said bottom drum for drawing sludge adjacent to said vent.

5. Apparatus for purifying sulphur by heat treatment and distillation, comprising, in combination, a liquid retaining and vapor receiving drum, means communicating therewith for introducing liquid spray, a separating drum, liquid and vapor connections between said drums, a lower sludge collecting drum, risers for effecting liquid circulation connecting said lower drum with said separating drum, means for supplying molten sulphur to said spray introducing means, and means for educting sulphur vapor from said separating drum; said drums and connections being fabricated of material resistant to reaction with elemental sulphur.

6. Apparatus for purifying sulphur by heat treatment and distillation, comprising, in combination, a liquid retaining and vapor receiving drum, means communicating therewith for introducing liquid spray, a separating drum, liquid and vapor connections between said drums, a lower sludge collecting drum, risers for effecting liquid circulation connecting said lower drum with said separating drum, means for supplying molten sulphur to said spray introducing means, means for educting sulphur vapor from said separating drum, and means for collecting and withdrawing sludge at one end of said lower drum; said drums and connections being fabricated of material resistant to reaction with elemental sulphur.

7. In apparatus for purifying sulphur by heat treatment and distillation, the combination comprising a liquid retaining chamber having a vapor space and a head for introducing a liquid spray, a separating chamber provided with a vapor space, liquid and vapor connections between said chambers, a sludge collecting chamber disposed below said retaining and separating chambers and provided with liquid circulating connections communicating with said separating chamber, conveyor means in said lower chamber for collecting sludge at one end of said chamber, and cooperating means for withdrawing said collected sludge.

8. Apparatus for purifying sulphur comprising the combination with means for conveying a supply of crude molten sulphur, of a retaining vessel connected to said sulphur conveying means and arranged to receive and hold a relatively large volume of crude molten sulphur, a second vessel connected to communicate with said receiving vessel and provided with means for heating the molten sulphur therein whereby a distillate consisting of sulphur vapor and a reaction product results, a pre-heating chamber interposed in said crude molten sulphur conveying means and connected to said first-named vessel in a manner providing relatively free communication therewith whereby a supply of sulphur heating vapor is admitted, a dispersing means disposed in said pre-heating chamber whereby the incoming sulphur is divided and made to contact the sulphur vapor and become heated, and a distillate collecting and delivering dome connected to an outlet of said second vessel and provided with means for separating and returning any condensed sulphur in the distillate.

9. Apparatus for purifying sulphur comprising the combination with means for conveying a supply of crude molten sulphur, of a retaining vessel connected to said sulphur conveying means and arranged to receive and hold a relatively large volume of crude molten sulphur, a second vessel provided with connections to said first-named vessel affording communication for both the liquid and vapor spaces thereof, heating means for heating the molten sulphur in said second vessel and generating a distillate consisting of sulphur vapor and a reaction product, a pre-heating chamber interposed in said crude molten sulphur conveying means and connected to said first-named vessel in a manner providing relatively free communication therewith whereby a supply of sulphur heating vapor is admitted, a dispersing means disposed in said pre-heating chamber whereby the incoming sulphur is divided and made to contact the sulphur vapor and become heated, and a distillate collecting and delivering dome connected to an outlet of said second vessel and provided with means for separating and returning any condensed sulphur in the distillate.

10. Apparatus for purifying sulphur comprising the combination with means for conveying a supply of crude molten sulphur, of a retaining vessel connected to said sulphur conveying means and arranged to receive and hold a relatively large volume of crude molten sulphur, a second vessel associated with said retaining vessel and provided with a pair of pipe connections at one end communicating respectively with the vapor spaces and with the liquid spaces of said vessels and adapted to permit countercurrent movement of the molten sulphur with reference to a portion of the sulphur vapor which may be drawn off through the first-named vessel, means for heating the molten sulphur in said second-named vessel and generating a distillate consisting of sulphur vapor and a reaction product, a pre-heating chamber interposed in said crude molten sulphur conveying means and connected to said first-named vessel in a manner providing relatively free communication therewith whereby a supply of sulphur heating vapor is admitted, a dispersing means disposed in said pre-heating chamber whereby the incoming sulphur is divided and made to contact the sulphur vapor and become heated, and a distillate collecting and delivering dome connected to an outlet of said second vessel and provided with means for separating and returning any condensed sulphur in the distillate.

CLARENCE O. LEE.
HOMER A. SMITH.